United States Patent Office 3,732,324
Patented May 8, 1973

3,732,324
PROCESS FOR PRODUCING OIL-SOLUBLE SULFONATE FEEDSTOCK
Stephen E. McGuire and Carl D. Kennedy, Ponca City, Okla., assignors to Continental Oil Company, Ponca City, Okla.
No Drawing. Filed Apr. 2, 1971, Ser. No. 130,832
Int. Cl. C07c 3/56
U.S. Cl. 260—671 G                                    14 Claims

ABSTRACT OF THE DISCLOSURE

An olefinic material containing from about 20 to about 36 carbon atoms is contacted with an arene compound in the presence of a catalyst system which includes a complex of aluminum chloride and nitromethane to thereby alkylate the arene compound. The product is fractionated to yield an alkylate having a boiling point of at least 200° C. at 20 mm. Hg pressure, which alkylate is useful as a feedstock for producing oil-soluble sulfonates.

BACKGROUND OF THE INVENTION

(1) Field of the invention

This invention relates to processes for the production of heavy alkylates useful as sulfonation feedstocks suitable for the production of oil soluble sulfonates.

(2) Brief description of the prior art

Oil soluble sulfonates constitute important additives to lubricating oils. These sulfonates are produced by sulfonating heavy alkylate prepared by reacting benzene or other arenes with relatively high molecular weight olefins in the presence of a suitable alkylation catalyst.

In one previously used method of preparing the heavy alkylate, the high molecular weight olefins are first produced by dimerizing the monomeric olefin in the presence of an acid catalyst of the Bronsted or Lewis type. The dimerized olefin is then contacted with benzene in the presence of a Lewis acid catalyst to yield a mixture of alkyl benzene compounds. These are then fractionated to remove relatively lower boiling materials unsuitable as sulfonation feedstock materials. In general, this lower boiling fraction is all of the material in the product mixture which boils below about 335° C. at atmospheric pressure.

SUMMARY OF THE PRESENT INVENTION

This invention provides a process for producing heavy alkylate suitable for use as an oil soluble sulfonate feedstock material. The improvement is realized in increased yields of the desired heavy alkylate, and a decrease in the quantities of undesirable, lower boiling by-products which are produced. The described advantages are achieved as a result of the modification of the catalyst system employed in the alkylation reaction.

Broadly described, the present inventioin comprises contacting a relatively high molecular weight olefinic material which contains from about 20 to about 36 carbon atoms with benzene in the presence of an alkylation catalyst which comprises nitromethane-moderated aluminum chloride. The mole ratio of nitromethane to aluminum chloride in the catalyst complex may range from about 1:1 to about 10:1. There is then yielded a reaction product which contains an unusually high amount of high boiling heavy alkylate of the type sought.

An object of the invention is to provide an improved process for producing a heavy alkylate feedstock for a sulfonation process used to prepare oil soluble sulfonates.

Another object of the invention is to provide a more effective catalyst for producing heavy alkylates suitable for sulfonation to yield an oil soluble sulfonate lubricating oil additive.

Other objects and advantages will be come apparent as the following detailed description of preferred embodiments of the invention are read and considered.

DETAILED DESCRIPTION OF PREFERRED EMBODIMENTS OF THE INVENTION

In the process of the present invention, the improved yields of heavy alkylate suitable for sulfonation are obtained by reacting an olefinic hydrocarbon material containing from about 20 to about 36 carbon atoms, or mixtures of such materials, with a suitable arene material in the presence of a catalyst system consisting essentially of a complex of aluminum chloride and nitromethane. The olefinic material employed is preferably a highly branched olefinic compound, or mixture of such compounds, such as the mixture prepared by dimerizing a so-called tetrapropylene (which is actually a mixture of highly branched olefinic hydrocarbons containing from 10 to 14 carbon atoms, with the $C_{12}$ olefins predominating).

In a process currently in use for producing this particular olefinic material, tetrapropylene is initially dimerized by contacting this highly branched material with any of a variety of catalytic materials of acidic character. Both Bronsted acid and Lewis acid catalysts are suitable. These include the metal halides, such as aluminum or zinc chloride or boron tetrafluoride, and also sulfuric and phosphoric acids. Solid fixed bed type catalysts such as silica-alumina pellets may also be utilized. The dimerization reaction can be carried out over a wide range of temperatures, but temperatures of from about 20° C. to about 50° C. have generally been employed and found most suitable. Preferably, the tetrapropylene is added slowly to the catalyst material while the mixture is agitated. After the action has progressed for a time, there are produced a crude dimerized olefin derivative of the tetrapropylene, and a sludge which contains unreacted catalytic material. The sludge layer is separated from the crude dimer which is then used in the alkylation step.

The crude dimer, or other suitable olefinic material, is then contacted with an arene compound which is to be alkylated to yield the heavy alkylate desired. While a preferred arene subjected to the alkylation step of the invention is benzene, other aromatic compounds, such as toluene and xylene, can be employed. It should be noted that para-xylene does not respond well to the alkylation, but that normally the small amount of para-xylene found in most unsegregated xylene streams does not interfere seriously with the alkylation step of the reaction where xylene is employed. It is generally desirable that the aromatic compounds subjected to the alkylation be limited to monocyclic species.

The olefinic material containing from about 20 to about 36 carbon atoms is contacted with the benzene or other suitable arene material after the arene has been preheated to the alkylation reaction temperature. This temperature, maintained during the course of the reaction, is most suitably in the range of from about 25° to about 80° C. Contact of the olefinic material with the arene to be alkylated is carried out in the presence of a catalyst comprising nitromethane-moderated aluminum chloride. Actually, the catalyst system used is a complex formed by nitromethane and aluminum chloride when mixed in a mole ratio of about 1:1. The catalyst system may, without detriment, include an excess of either nitromethane or the aluminum chloride, however, and in fact in some alkylation reactions, it has been found beneficial to include an excess of the nitromethane so that the mole ratio of the two materials is about 2:1 nitromethane to aluminum chloride. The total amount of the catalyst materials used may vary, with from about 1 weight percent to about 8 weight percent of the aluminum chloride (based on the weight of olefin starting material) being employed. The large amounts of catalyst are used in the lower portion of the described temperature range for carrying out the alkylation.

After termination of the elevated temperature reaction period, the reaction mixture is preferably post-stirred for a brief period, and the sludge formed during the reaction is then separated from the remaining liquid which includes the desired heavy alkylate, along with lower boiling materials. The mixture remaining after removal of the sludge is preferably stirred vigorously with a mixture of ice and water and then is further washed with water until the wash is neutral. The liquid product is then filtered and fractionated by distillation. The bottoms fraction which boils above about 335° C. is the heavy alkylate desired. The distillation is preferably carried out under vacuum.

The following examples will further demonstrate typical practice of the invention.

EXAMPLE 1

An $AlCl_3$—$CH_3NO_2$ catalyst complex was prepared by mixing 13.4 grams (0.10 mole) of aluminum chloride with 61 grams (1.0 mole) of nitromethane in a vessel sealed from moisture. The catalyst was then placed in a 500 ml. creased flask fitted with a magnetic stirrer, thermometer, dropping funnel and condenser with drying tube. 168 grams of tetrapropylene (1.0 mole) were then added dropwise to the catalyst during stirring at a temperature of between 25° C. and 30° C. over a one hour period. The mixture was post-stirred 30 minutes, and the nitromethane then stripped off by vacuum distillation at a bottoms temperature of 30° C. This required an initial vacuum of 30–40 mm. of Hg which was slowly reduced to 10 mm. Hg. After removal of the free nitromethane by vacuum distillation, the bottoms remaining weighed 183 grams. A sludge layer which separated and contained catalyst complex was drawn off for subsequent use in the alkylation step. The sludge weighed 28.5 grams. By gas-liquid chromatographic analysis, it was determined that 74 weight percent of the tetrapropylene was dimerized.

550 grams (7.0 moles) of benzene were weighed into a flask fitted with a magnetic stirrer, a dropping funnel, a condenser and a thermometer. The 28.5 grams of sludge yielded in the dimerization of the tetrapropylene and 8.4 grams of $AlCl_3$ were placed in the flask with the benzene and preheated to 40° C. The crude tetrapropylene dimer prepared in the initial step was then added dropwise over a period of 30 minutes at a temperature of 40° C. to 45° C. After a 30 minute post-stirring period, 44.2 grams of sludge was drawn off, and the remaining liquid was stirred vigorously with a mixture of ice and water. The organic layer was then separated and washed with water until the washings were neutral to p-Hydrion paper. The organic liquid was filtered and distilled. After the excess benzene was stripped off, the following fractions were isolated:

| Fraction: | Boiling point, °C./20mm. Hg | Weight, g. |
|---|---|---|
| 2 | IBP-124 | 22.4 |
| 3 | 124-105 | 38.0 |
| 4 | 205-232 | 14.1 |
| Bottoms | >232 | 94.5 |

Fraction 4 and the bottoms material constituted heavy alkylate suitable for a sulfonation feedstock to make sulfonate lubricating oil additives.

When an identical process was carried out except for the conventional use of an aluminum chloride catalyst in both the dimerization and alkylation reactions, instead of the nitromethane-aluminum chloride complex, a somewhat lower yield of the heavy alkylate was produced. The comparative yields may be represented as follows:

| Catalyst | Lbs. heavy alkylate/lbs. olefin | Lbs. fraction 2/lbs. heavy alkylate | Lbs. fraction 3/lbs. heavy alkylate |
|---|---|---|---|
| $AlCl_3$ alone | 0.4 | 0.8 | 0.8 |
| $AlCl_3$—$CH_3NO_2$ | 0.65 | 0.2 | 0.35 |

It may be seen that nitromethane modification of the conventionally employed aluminum chloride catalyst results in substantially increasing the yield of the desired heavy alkylate product.

EXAMPLE 2

A nitromethane-aluminum chloride complex was prepared by mixing 13.4 grams (about 0.1 mole) of aluminum chloride with 61 grams (1.0 mole) of nitromethane in a vessel sealed against moisture. An exothermic reaction occurred upon mixing the catalyst components. After preparation of the complex, it was placed in a 500 ml. creased flask fitted with a mechanical stirrer, thermometer, dropping funnel and condenser with a drying tube. 168 grams (1.0 mole) of tetrapropylene was added dropwise to the complex at a temperature of 40° C. over a period of one hour. The mixture was then post-stirred for 3½ hours at 40° C. After this, the mixture was transferred to a separatory funnel and allowed to stand for a period of between 45 minutes and one hour. A sludge layer was then removed which weighed approximately 83 grams. After stripping out about 2 grams of dissolved nitromethane, the crude dimer was then used in the alkylation step as follows:

550 grams (7.0 moles) of benzene and 7.5 grams (0.05 mole) of fresh aluminum chloride were weighed into a flask fitted with a stirrer, dropping funnel, condenser and thermometer. The contents were heated to a temperature of between 40° and 45°, and the crude tetrapropylene dimer from the dimerization step was then added at this temperature over a period of 30 minutes. When approximately half of the crude dimer had been added, an additional 7.5 grams of aluminum chloride was added, making the total aluminum chloride present in the alkylation reaction mixture about 0.1 mole.

After addition of the total amount of dimer, the mixture was post-stirred for a period of 30 minutes at a temperature between 40° C. and 45° C., and was then transferred to a separatory funnel and allowed to stand for 45 minutes to facilitate removal of the sludge layer. The alkylate constituting the upper phase in the separatory funnel was hydrolyzed with cold water, and was washed once with dilute caustic and two times again with water. The alkylate was then dried and distilled under vacuum in the manner described in Example 1.

In carrying out the run described in this example, 74 weight percent of the tetrapropylene was dimerized as in Example 1, but the yield of heavy alkylate was considerably lower than when the sludge from the dimerization was used in the alkylation step as described in Example 1. There was a corresponding increase in the amounts of lower boiling byproducts. This result is shown by the following comparative data:

| alkylation catalyst | Lbs. heavy alkylate/lbs. olefin | Lbs. fraction 2/lbs. heavy alkylate | Lbs. fraction 3/lbs. heavy alkylate |
|---|---|---|---|
| $AlCl_3$ alone | 0.42 | 0.53 | 0.86 |
| Sludge from dimerization | 0.65 | 0.2 | 0.35 |

This example thus demonstrates that the nitromethane component of the sludge from the dimerization reaction was responsible in the Example 1 procedure for the realization of an increase in the yield of the heavy alkylate.

EXAMPLE 3

A series of additional dimerization and alkylation runs were carried out in substantially the same manner described in Example 2 with 15 grams (0.1 mole) of fresh aluminum chloride being used in the alkylation reaction, along with varying amounts of nitromethane as indicated in the following table which sets forth in the results obtained in the runs:

| Run | Weight percent conversion to dimer | Weight of CH₃NO₂ used, grams | Mole ratio CH₃NO₂/ AlCl₃ | Alkylation product yield weight ratios | | |
|---|---|---|---|---|---|---|
| | | | | Heavy alk./ olefin | Fraction 2/ heavy alk. | Fraction 3/ heavy alk. |
| 1 | 68 | 0 | | 0.42 | 0.52 | 0.75 |
| 2 | 68 | 2.0 | 0.33:1 | 0.49 | 0.47 | 0.70 |
| 3 | 74 | 6.0 | 1:1 | 0.59 | 0.31 | 0.51 |
| 4 | 74 | 9.0 | 1.5:1 | 0.61 | 0.23 | 0.38 |
| 5 | 68 | 12.0 | 2:1 | 0.5 | 0.28 | 0.50 |
| 6 | 74 | 12.0 | 2:1 | 0.65 | 0.19 | 0.30 |

The data tabulated in the foregoing table show that optimum results, in terms of heavy alkylate yielded, are obtained when the dimerization reaction is carried out to a relatively high conversion to the dimer (of about 75 weight percent), and using a nitromethane to aluminum chloride ratio of about 2:1. A comparison of the results obtained in Runs 1 and 2 of this series shows that even at relatively low conversions to the dimer, the inclusion of a small amount (2 grams) of nitromethane significantly improves the heavy alkylate yield. Example 2, however, shows that a high conversion to dimer does not alone function to significantly increase the yield of heavy alkylate.

Although the foregoing description of the invention provides illustrative examples of the manner in which it may be practiced, various changes and innovations can be effected in the described procedure without departure from the basic principles which underlie the invention. Changes of this type are deemed to be circumscribed by the spirit and scope of the invention except as the same may be limited by the appended claims or reasonable equivalents thereof.

What is claimed is:

1. A method for producing a heavy alkylate sulfonation feedstock suitable for the preparation of oil soluble sulfonates comprising contacting one or more highly branched olefinic compounds containing from about 20 to about 36 carbon atoms with a monocyclic arene compound in the presence of an alkylation catalyst consisting essentially of nitromethane and aluminum chloride.

2. The method defined in claim 1 wherein said contact is carried out at a temperature of from about 25° C. to about 65° C.

3. The method defined in claim 1 and further characterized as including the step of fractionating the product mixture yielded by said contact to produce an alkylate fraction boiling at a temperature above about 335° C.

4. The method defined in claim 1 wherein said catalyst is a complex of nitromethane and aluminum chloride present in substantially a 1:1 mole ratio.

5. The method defined in claim 1 wherein said olefinic compounds include a predominance of a dimer of tetrapropylene.

6. A method for producing a heavy alkylate sulfonation feedstock comprising:
   contacting tetrapropylene with a polymerization catalyst to yield a highly branched dimer of tetrapropylene;
   contacting a monocyclic arene compound with the tetrapropylene dimer in the presence of an alkylation catalyst consisting essentially of nitromethane and aluminum chloride to produce a product mixture containing alkylated arene material; then
   isolating from the product mixture, an alkylate fraction boiling at a temperature above about 335° C.

7. The method defined in claim 6 wherein said arene compound is benzene.

8. The method defined in claim 6 wherein said alkylation catalyst contains nitromethane and aluminum chloride in a mole ratio of about 1 to 1.

9. The method defined in claim 6 wherein at least 70 weight percent of the tetrapropylene is converted to dimer.

10. The method defined in claim 6 wherein the polymerization catalyst utilized is selected from the group consisting of Lewis acid and Bronstered acid catalyst.

11. The method defined in claim 7 wherein the contact of benzene with the tetrapropylene dimer is carried out at a temperature of from about 25° C. to about 65° C.

12. The method defined in claim 11 wherein said polymerization catalyst is aluminum chloride.

13. The method defined in claim 12 wherein said polymerization to yield the dimer of tetrapropylene is carried out at a temperature of from about 20° C. to about 50° C.

14. The method defined in claim 13 wherein said alkylate fraction is isolated from the product mixture by fractional distillation.

References Cited
UNITED STATES PATENTS

| | | | |
|---|---|---|---|
| 3,248,443 | 4/1966 | McEwan et al. | 260—671 B |
| 3,109,869 | 11/1963 | Chambers et al. | 260—671 B |
| 2,756,265 | 7/1956 | Hollyday | 260—671 C |
| 3,332,989 | 7/1967 | Snyder et al. | 260—671 B |

CURTIS R. DAVIS, Primary Examiner